United States Patent Office 3,467,831
Patented Sept. 16, 1969

3,467,831
CIRCUIT BREAKER FOR VEHICLE LIGHTS
Charles M. Wilson, 5987 Gloria Drive, and Edwin F. Goman, 6090 South Land Park Drive, both of Sacramento, Calif. 95822
Filed Feb. 13, 1968, Ser. No. 705,107
Int. Cl. H02j 1/00
U.S. Cl. 307—10                                    4 Claims

ABSTRACT OF THE DISCLOSURE

Connected to the lighting system of a motor vehicle, a circuit breaker is actuated automatically upon switching off the ignition switch and opening a vehicle door, the circuit breaker being effective to deactivate the lighting system. Circuit breaker resetting mechanism is also provided.

---

The invention relates to improvements in devices for automatically extinguishing the lights of a motor vehicle.

The prior patent art as well as the literature is replete with devices of various kinds to prevent the drain on a vehicle's battery resulting from a failure to extinguish the lights when the vehicle's ignition has been switched off. For the most part, the previous mechanisms have been directed toward warning devices of a visible or audible nature serving to remind the driver of the vehicle that the lights have not been turned off and that switching action is necessary. Other previously used devices have been quite complicated and expensive.

It is therefore an object of the invention to provide a circuit breaker for vehicle lights which is not only relatively inexpensive to install and operate, but which is also automatic in its actuation, and which does not depend upon warning signals.

It is another object of the invention to provide a circuit breaker which can be installed either at the factory or at a later time.

It is yet a further object of the invention to provide a vehicle light circuit breaker which is reliable, durable and substantially fool-proof in operation, and which especially lends itself to installation when provided in the form of a kit.

It is another object of the invention to provide a generally improved circuit breaker for vehicle lights.

Figure 1:
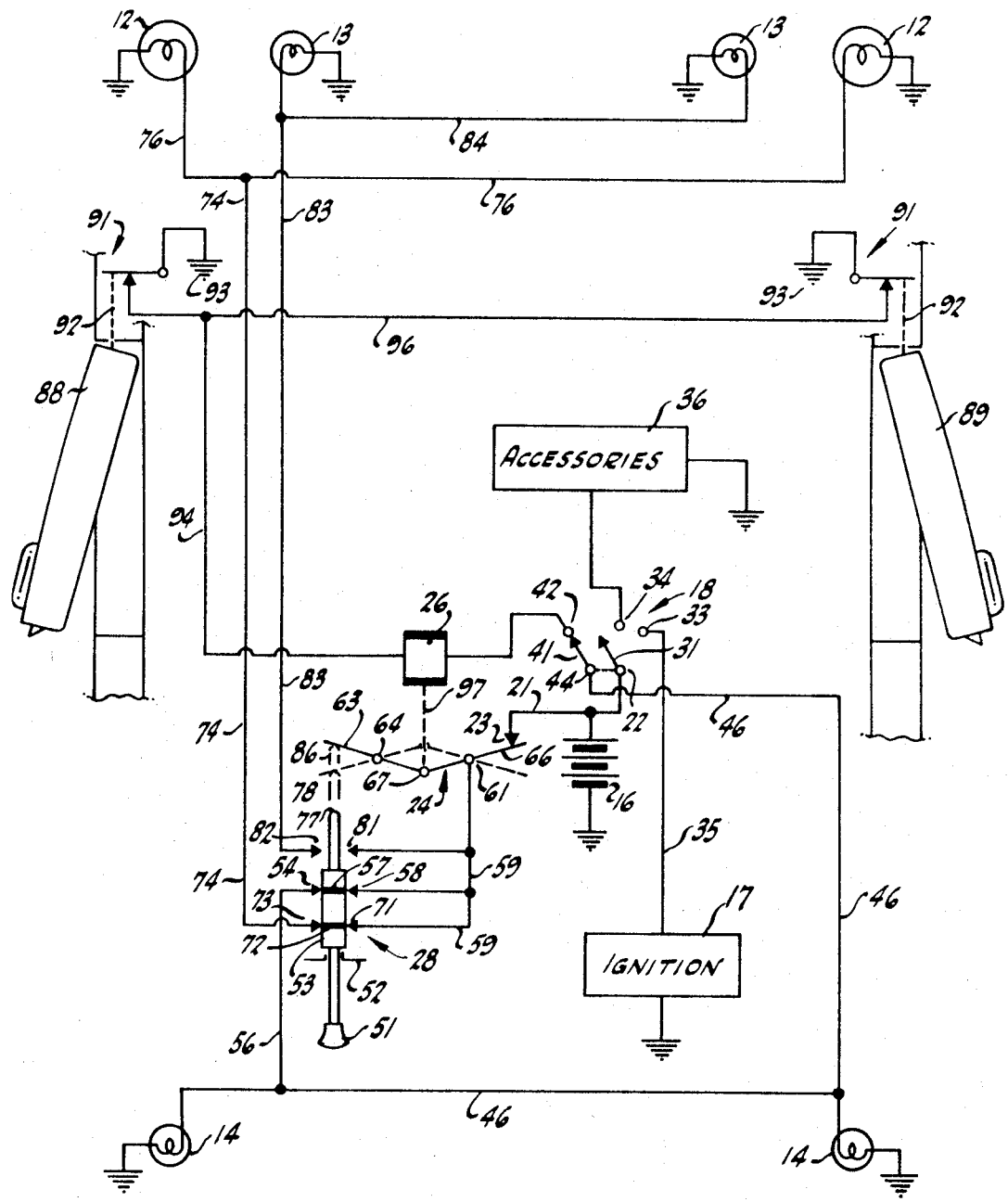
Figure 2:
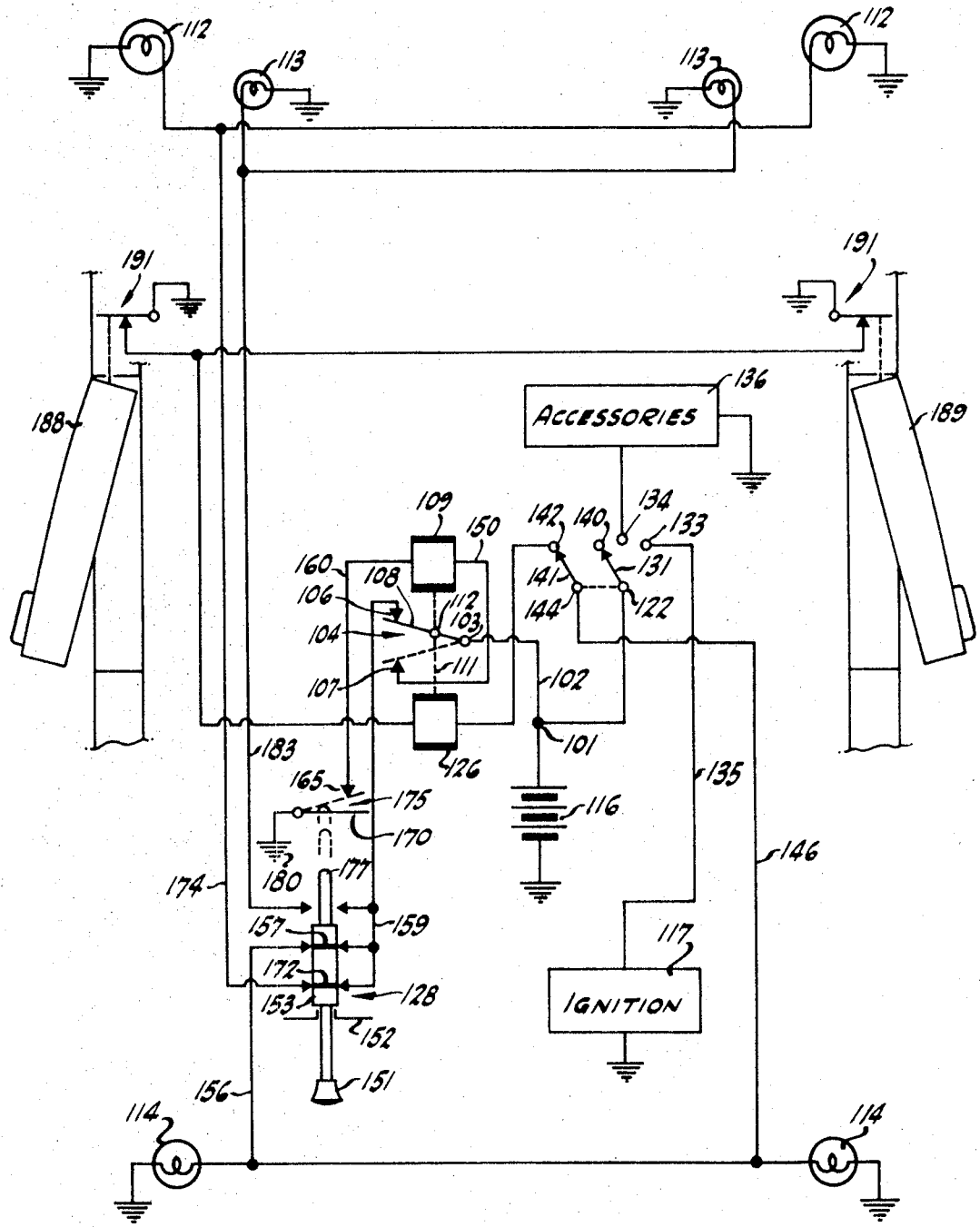

Other objects, together with the foregoing, are attained in the embodiments described in the following description and shown in the accompanying drawings in which:

FIGURE 1 is a schematic diagram showing one form of circuit breaker installation; and, FIGURE 2 is a schematic diagram showing another form of circuit breaker installation.

While the circuit breaker system of the invention is susceptible of numerous physical embodiments, depending upon the environment and requirements of use, substantial numbers of the herein shown and described embodiments have been made, tested and used, and all have performed in an eminently satisfactory manner.

In both of the embodiments depicted herein, the environment is the same; that is to say, the devices are installed in a motor vehicle having the customary headlights 12, parking lights 13 and tail lights 14, each connected to ground. A battery 16 provides electrical energy as demanded by the lamps and is connected to the vehicle's ignition system 17 through an ignition switch, generally designated by the reference numeral 18.

The battery 16 is attached to a conductor 21 connecting the main terminal 22 of the ignition switch to a contact 23 associated with a toggle switch 24 mechanically actuated by a circuit breaker coil 26, or relay. The contact 23 is also associated with the vehicle's light switch, generally designated by the reference numeral 28.

In customary fashion, the main terminal 22 of the ignition switch is arranged for orientation in any one of three positions. The first is an "off" position such as is illustrated in FIGURE 1, wherein the wiper arm 31 is not in contact. The second is an "on" position wherein the wiper 31 engages the contact 33 connected to the wire 35 extending to the ignition system 17. The third is an intermediate position, against a contact 34 leading to the vehicle accessories 36, such as the radio, or heater fan, or the like.

In ganged relation to the main ignition switch arm 31 is a secondary wiper arm 41 movable in mechanical conjunction with the main switch arm 31 between a position of contact, as appears in FIGURE 1, with a terminal 42, and attitudes of nil contact when the main arm 31 engages either the accessory terminal 34 or the ignition terminal 33. In other words, the secondary arm 41 is operable only when the main ignition switch arm 31 is "off" as shown in FIGURE 1.

It will be noted that whereas the main wiper arm terminal 22 is connected directly to the battery 16, via the conductor 21, the secondary wiper arm terminal 44 is attached to a wire 46 connected in shunt to the two rear tail lights 14. Energization of the tail lights is effected by appropriate manipulation, by the driver of the vehicle, of the light switch "knob" 51 adjacent the car's dashboard 52.

In the outermost position of the knob 51 and the attendant plunger 53, as appears in FIGURE 1, the terminal 54, connected to the wire 56 extending to the tail lights 14, contacts a conductor strip 57 on the plunger 53. The conductor strip 57, in turn, is contacted by a terminal 58 extending to a wire 59 running to a terminal 61 on the toggle switch 24.

The toggle switch 24 is movable between the position shown in full line and the position shown in broken line in FIGURE 1, the off-center arrangement of the leg 63 pivoted on the fulcrum 64 and the leg 66 pivoted on the fulcrum 61 being effective to "lock" the toggle in either extreme position of the pivot 67.

In the toggle switch 24 shown schematically in FIGURE 1, the rockable leg 66 is electrically conductive and the pivot 61 is, as stated above, also an electrical terminal of the conductor 59.

Consequently, with the toggle switch components in the position shown in full line in FIGURE 1, current flows from the battery 16 through the wire 21 to the contact 23, thence along the conductor 66, through the pivot-like terminal 61 and along the conductor 59 to the contact 58. Bridging the light switch 28 via the conductor strip 57, the battery current passes through the contact 54 and flows through the wire 56, thence through the wire 46 to the tail lights 14.

Concurrently, a portion of the current flows toward the ignition switch 18 and is presented at the terminal 44 of the secondary switch arm 41.

It is also to be noted at this juncture, that with the light switch plunger 53 in the fully extended position shown in FIGURE 1, not only are the tail lights energized, as previously explained, but the headlights 12 are also lit. In other words, current from the conductor 59 passes through a contact 71 engaging a conductor strip 72 on the plunger 53, thence flows from a strip-engaging contact 73, through a conductor 74 and a shunt wire 76 to the two headlights 12.

In other words, with the light switch 28 in the fully extended condition shown in FIGURE 1, the "lights," i.e. the headlights and the tail lights, are "on." A potential also exists at the terminal 44.

With the tip 77 of the plunger 53 in the intermediate location shown fragmentarily and in broken line in FIGURE 1, and indicated by the reference numeral 78, both the parking lights 13 and the tail lights 14 are "on" whereas the headlights 12 are "off." It is not believed necessary to describe the structure in detail, it being sufficient to say that with the plunger tip in the position 78, the plunger conductor strip 57 bridges the terminals 81 and 82, thereby allowing current to flow from the conductor 59 to the wire 83, thence through shunt wire 84 to the parking lights 13.

As will be also noted, that with the plunger tip 77 in the intermediate position 78, the toggle switch leg 63 in its broken line position is not disturbed. However, by pushing inwardly on the light switch knob 51 to its extreme position adjacent the dashboard 52, the plunger tip 77 assumes the extreme inner location indicated by the reference numeral 86, corresponding to "all lights off" position, this translational movement also being effective to trip the toggle switch as will later be explained in detail.

When driving at night, the light switch 28 and the toggle switch components would customarily be in the position shown in full lines in FIGURE 1. Concurrently, of course, the ignition switch 31 is in "on" position, with the main terminal arm 31 in contact with the wire 35 extending to the ignition system 17. Suitable bridging (not shown) is also provided to connect the energy source to the accessories 36.

At the same time, as previously explained, the secondary wiper arm 41 would be in an open circuit position. Thus, while energy is available at the terminal 44, no current flow through the relay 26 can occur because of the open circuit condition of the secondary arm 41.

Upon arriving at the destination, the driver would ordinarily turn off the ignition 18, thereby opening the ignition and accessories circuits, thereby simultaneously closing the secondary switch 41, as shown in FIGURE 1.

If, at this juncture, the driver also remembers to turn off the lights by pushing inwardly on the knob 51, the bridging strips 57 and 72 on the plunger 53 are displaced from any of the lamp contacts, and all lights are extinguished.

If, on the other hand, the driver forgets and fails to turn off the light switch, the lamps will be automatically extinguished the instant the driver endeavors to leave the car, either by the left-hand door 88 or the right-hand door 89. The reason for this is that there is connected to each door, a door switch 91 actuated by a mechanical connection 92 to the door, the connection being such that with the door closed, the circuit to ground 93 is open; but when the door begins to open, as in FIGURE 1, the switch 91 closes and the door circuit is closed, thereby allowing the current available at the secondary terminal 44 to flow through the relay 26, thence through the wire 94 and the shunt conductor 96 to the door switches 91 and to ground.

As current flow through the relay 26 occurs, the retracted plunger 97 trips the toggle switch from the full line to the broken line position in FIGURE 1, thereby opening the contact between the terminal 23 and the conductor 66. As this circuit is opened, current flow can no longer take place to the headlights and to the tail lights and these lights are therefore extinguished even though the driver has forgotten to turn off the light switch 28.

Once the relay 26 has actuated the toggle switch 24 in the manner just described, the lights circuit is held in open condition by reason of the overcenter position-retaining characteristic of a toggle switch.

Actuation of the relay 26, as the door is opened, would ordinarily be accompanied by an audible sound, such as a "click" as the toggle switch reverses position. At the same time, the lights would be extinguished, thus ordinarily affording a visible signal. In either event, or both, if noted, the driver should preferably immediately push in the knob 51 to the "lights off" position to reset the parts. In effecting this "lights off" position, the bridging strips 57 and 72 on the plunger 53 are moved out of registry with the contacts of the circuits of the lights, thus simultaneously opening the circuit leading to the secondary terminal 44 and to the relay 26. By the same movement (i.e. turning off the lights manually) the tip 77 of the plunger mechanically engages the left-hand arm 63 of the toggle, thereby restoring the toggle to its full line position and withdrawing the plunger 97 from the circuit breaker coil 26.

To summarize, the light switch 28 has preferably been turned off, manually, thereby preventing current flow through the relay even though the toggle contact 23 has re-engaged the toggle conductor arm 66, and even though the secondary wiper arm 41 engages the contact 42.

The foregoing paragraph has presupposed that the driver, having received an audible and a visible reminder, has manually reset the apparatus by turning off the light switch 28.

It is to be noted, however, that even though the driver fails to reset the device, the lights will go off immediately upon actuation of the relay, and that they will remain off, even after the door is again closed, owing to the position retaining characteristic of the toggle 24. In this situation, i.e. where the driver has not reset the parts the next time the driver wishes to drive with the lights on, a quick resetting of the toggle switch is effected by pushing in on the knob 51 momentarily, so as to close the 23 to 66 contact, followed by withdrawing the knob 51 to "lights on" position. The ignition switch 18 is activated, as customary, merely by moving the arm 31 into engagement with the contact 33.

The foregoing type of installation is highly reliable and economical and can readily be manually reset, as explained.

Some drivers, however, prefer the additional convenience afforded by an automatic type of resetting device for the toggle switch, and for this group we have provided the form of mechanism shown in FIGURE 2. As can readily be seen, a majority of the environment components are substantially identical with the FIGURE 1 form of device.

The following description refers to FIGURE 2.

When driving with the lights on, the ignition would be "on," i.e. the main switch arm 131 would be engaged with the contact 133 connected to the ignition system 117. Concurrently, the ganged secondary switch arm 141 would be in open position. So also, the light switch 128 would be "on," i.e. with the knob 151 and plunger 153 fully extended, as shown, so that the circuits both to the headlights 112 and to the tail lights 114 are closed and fully operative.

Current from the battery 116 to the load bus 159 flows through a junction 101 and a wire 102 leading to a terminal 103 on a toggle switch 104, the switch including an upper contact 106 and a lower contact 107, along with a switch bar 108 swingable between the two contacts 106 and 107 under urgency either of a circuit breaker coil 126, or of the reset coil 109. A mechanical operator 111 connects the relay 126 and the reset coil 109, the operator 111 also being pivotally attached at 112 to the switch bar 108.

With the switch bar 108 in the upper position shown in full line in FIGURE 2, current flow is through the upper contact 106 to the bus 159, thence to the vehicle lights via the conducting strips 157 and 172 and the wires 156 and 174, respectively.

When the car is stopped and the ignition switch is turned off by moving the main switch arm 131 away from the contact 133 to the null contact 140, the secondary switch arm 141 is concurrently swung into engagement with the contact 142 leading to the relay 126, thence to the normally open door switch 191.

The door switch 191 is closed by the driver moving either of the doors away from shut position.

As either door is opened, the door switch 191 closes, as shown in FIGURE 2, thereby allowing current to flow through and activate the circuit breaker coil 126. Upon being energized, the coil 126 retracts the plunger operator 111 and reverses the toggle switch 104 so that the switch bar 108 assumes the broken line position and engages the lower contact 107.

The lower contact 107 is attached to a wire 150 connected to the reset coil 109, from which coil a conductor 160 extends to a terminal 165 engageable with an arm 170 of a spring return switch 175 mechanically actuated by the tip 177 of the light switch plunger 153.

Normally, the switch arm 170 is in the lower position indicated in full line. Consequently, when the car is stopped, the ignition turned off, a door opened, and the circuit breaker coil 126 energized so as to bring the switch bar 108 into engagement with the lower contact 107, current does not flow through the switch 175 since the circuit is open.

The primary effect of actuating the circuit breaker coil 126, in other words, is merely to transfer battery potential away from the headlight and the tail light circuits, thereby extinguishing these lights. The toggle arrangement of the switch 104 causes the switch bar 108 to remain in engagement with the lower contact 107. The lights therefore remain "off."

Concurrently, the battery potential is transferred to the contact 165.

As previously explained in connection with the FIGURE 1 form of device, the actuation of the toggle switch 104 and the turning off of the lights, ordinarily provides the driver with a reminder that the light switch 128 should also properly be turned off, in which case the knob 151 is manually pushed inwardly by the driver toward the dashboard 152. This causes the plunger tip 177 to engage and bias upwardly the contact arm 170 against the contact 165, at which contact battery potential is available. The reset circuit is therefore closed to ground 180 and the reset coil 109 is energized, thereby restoring the switch bar 108 to its upper position, shown in full line, against the upper contact 106. Toggle action causes the bar 108 to remain in upper position even though the movement of the bar 108 away from the lower contact 107 has opened the reset circuit.

At the same time, even though battery potential is available in the bus 159, the lights remain off since the light switch 128 has been turned off.

The next time it is desired to turn the lights on, it is only necessary to withdraw the knob 151, thereby retracting the plunger tip 177 away from the switch arm 170. A return spring (not shown) in the switch 175 causes the arm 170 to swing away from the contact 165 and opens the circuit, thereby restoring the components to their original condition.

It can therefore be seen that in addition to the entirely manual reset mechanism of the FIGURE 1 form of device, we have also provided, as shown in FIGURE 2, a device wherein an automatic mechanism is utilized to reset the circuit breaker.

What is claimed is:

1. In combination with a motor vehicle electrical system including a battery, an ignition switch connected to the battery, and a light switch connected to the battery, a device for automatically extinguishing the vehicle's lights comprising:
   (a) a toggle switch interposed in the circuit connecting said battery and said light switch;
   (b) a normally open door-mounted switch closeable as the door is opened;
   (c) a switch mounted in ganged arrangement with said ignition switch, said switch being closed as said ignition switch is turned off;
   (d) a first conductor extending from said light switch to one side of said switch;
   (e) a second conductor extending from said door-mounted switch to the other side of said switch in closed position thereof; and,
   (f) a circuit breaker mechanism interposed in said second conductor and connected to said toggle switch, said circuit breaker being energized as said switch and said door-mounted switch are closed and being thereby effective to open said toggle switch to extinguish said vehicle lights.

2. The device of claim 1 wherein said toggle switch is mounted adjacent said light switch in interfering engagement therewith for reversal thereby as said light switch is turned off.

3. The device of claim 1 wherein said toggle switch includes a first contact, a second contact, and a switch bar selectively movable between said first and said second contacts, said switch bar being connected to said battery, said first contact being connected to said light switch.

4. The device of claim 3 further including a third contact, a normally open grounded switch arm adjacent said light switch and movable thereby into closed position against said third contact as said light switch is turned off, a third conductor connecting said second contact and said third contact, and a reset coil interposed in said third conductor, said reset coil including a movable operator connected to said toggle switch and effective to move said toggle switch bar from said second contact to said first contact as said reset coil is energized by closure of said switch arm against said third contact.

References Cited
UNITED STATES PATENTS

| | | |
|---|---|---|
| 2,722,673 | 11/1955 | Turner. |
| 3,321,663 | 5/1967 | Poznik _____ 307—10 X |
| 3,391,302 | 7/1968 | Weingarden _____ 315—83 |
| 3,414,763 | 12/1968 | Kibler _____ 315—80 |

ROBERT K. SCHAEFER, Primary Examiner

T. B. JOIKE, Assistant Examiner

U.S. Cl. X.R.

315—84